April 17, 1934.   C. E. WILLIAMS ET AL   1,955,108
BAGGING MACHINE
Filed Aug. 22, 1931   5 Sheets-Sheet 1
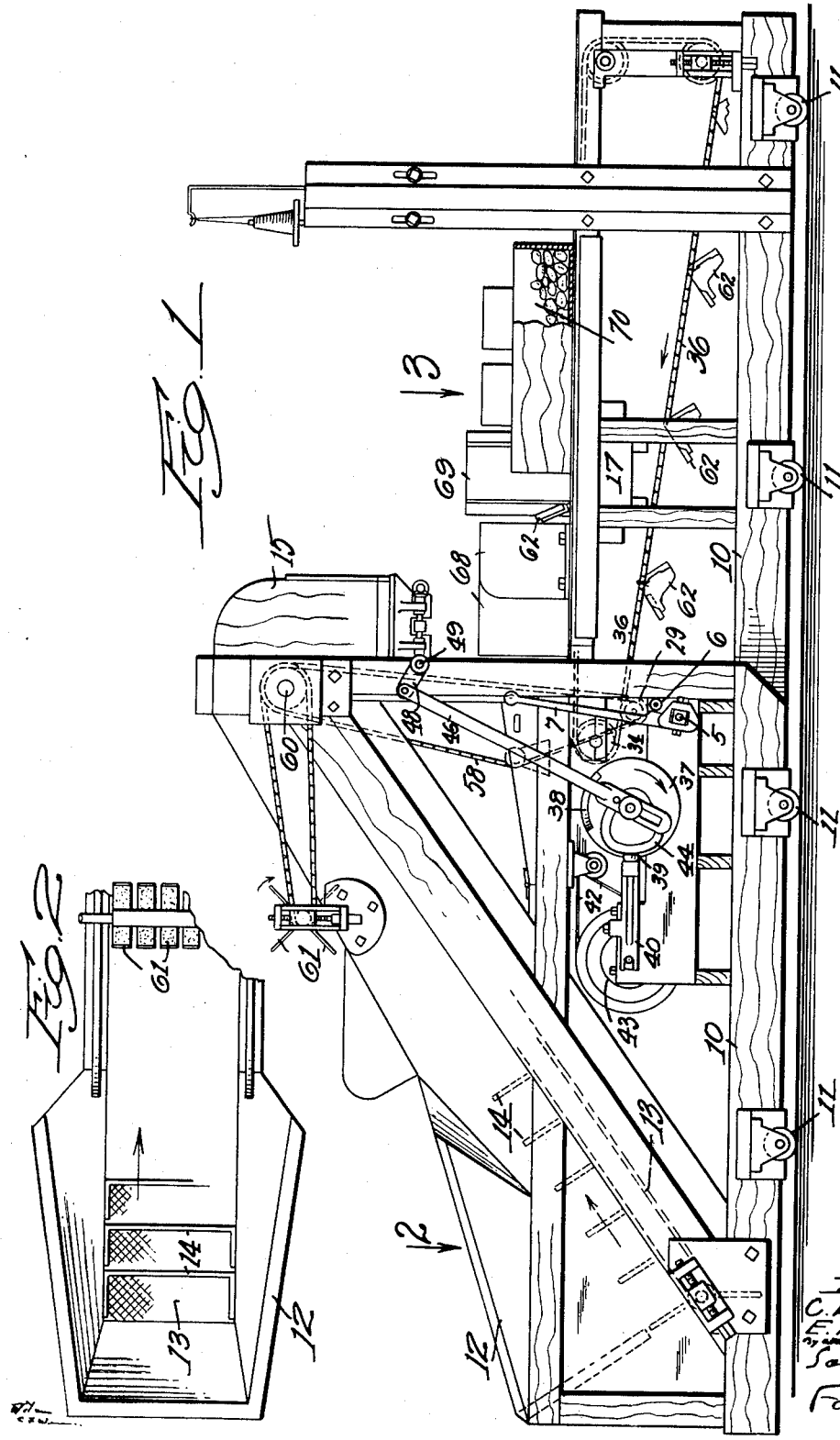

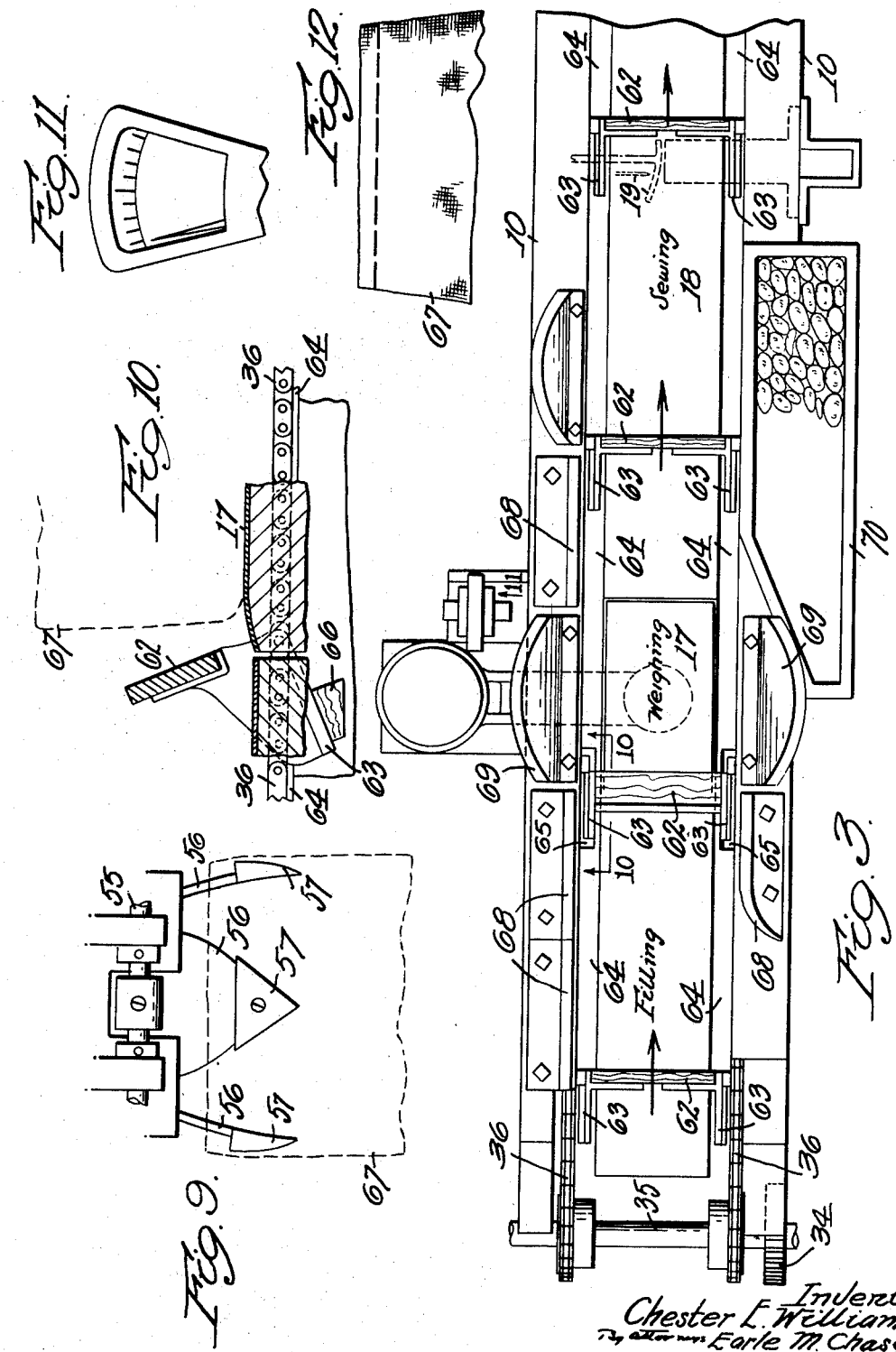

April 17, 1934.  C. E. WILLIAMS ET AL  1,955,108
BAGGING MACHINE
Filed Aug. 22, 1931  5 Sheets-Sheet 3
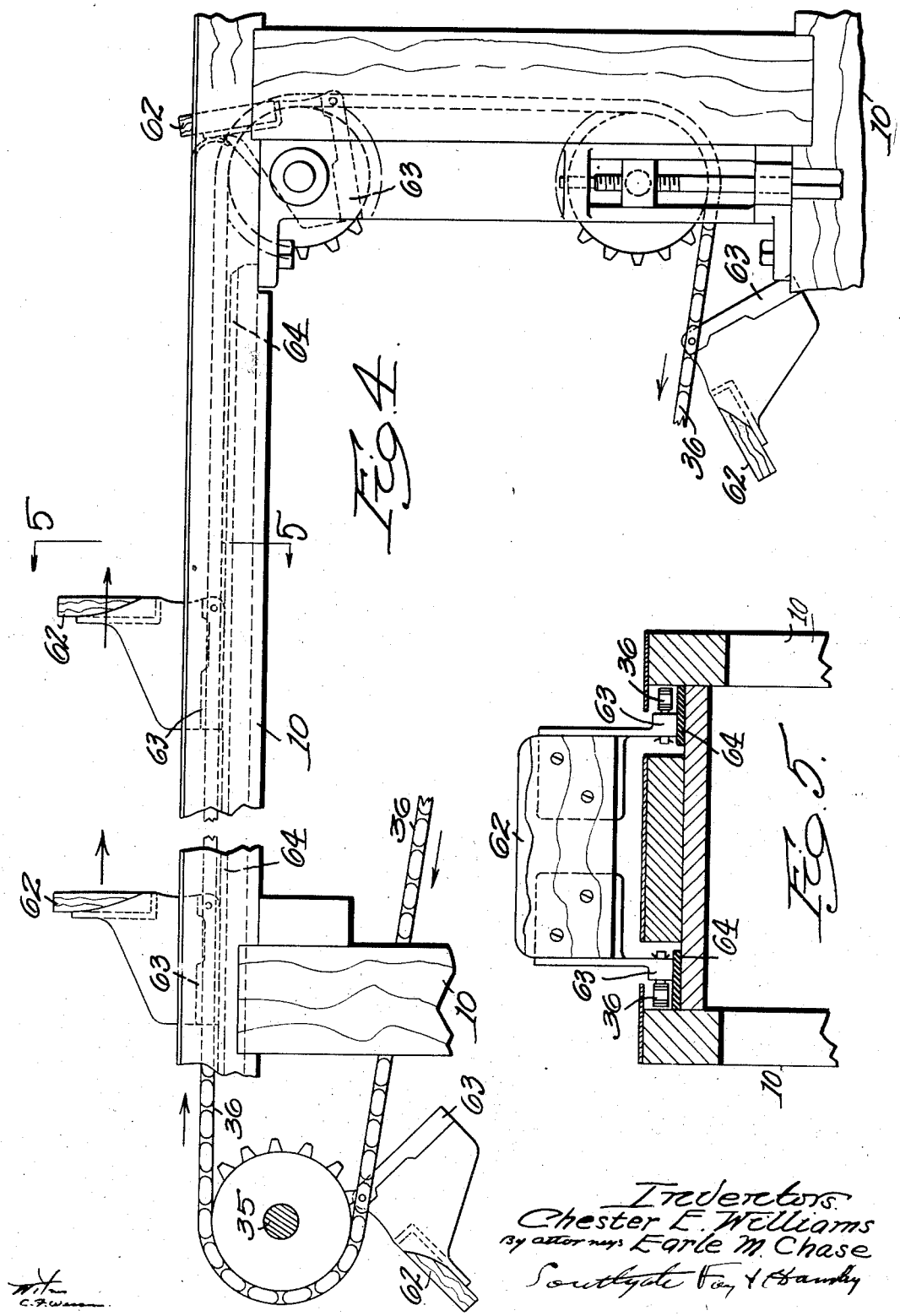

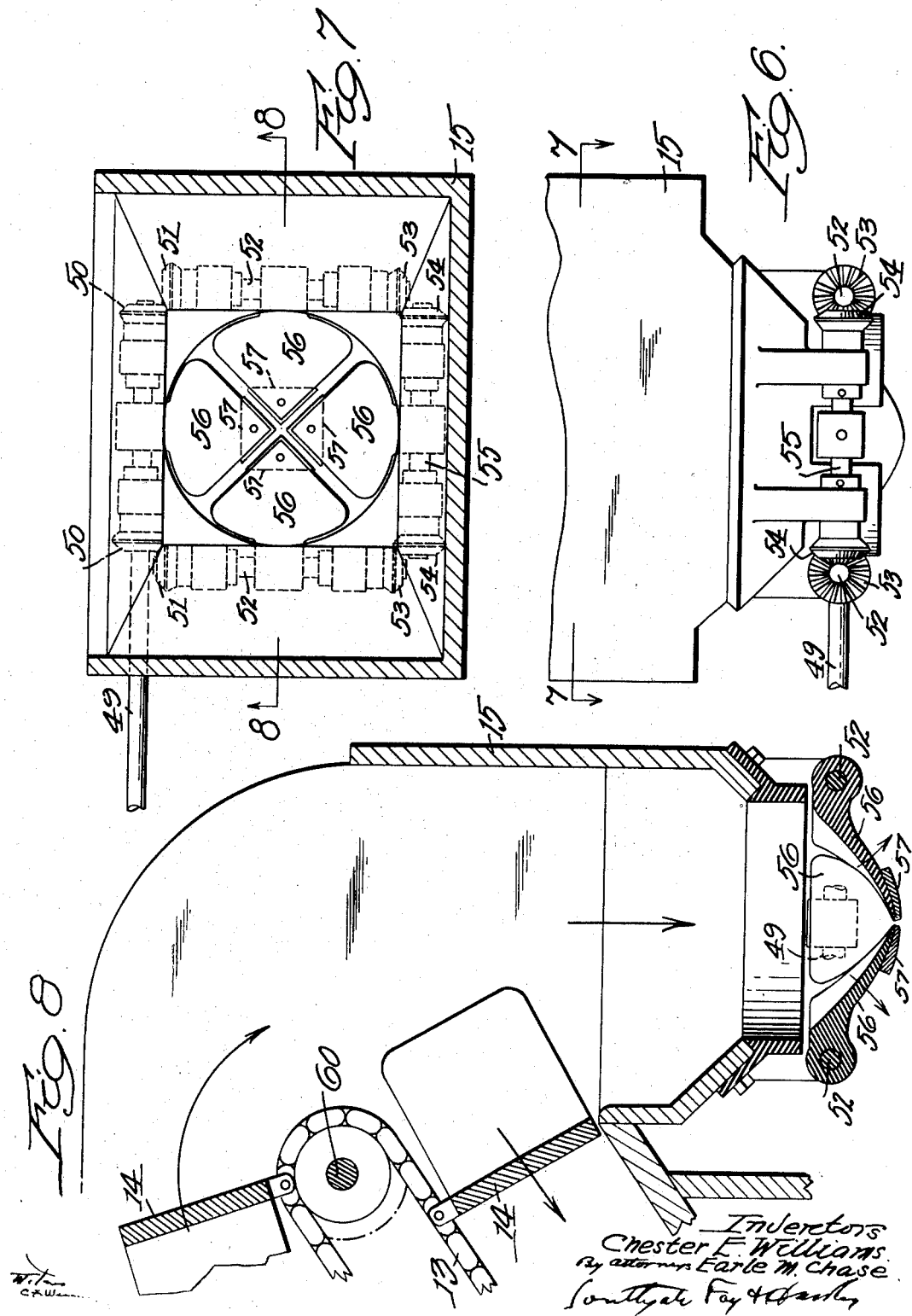

April 17, 1934.  C. E. WILLIAMS ET AL  1,955,108
BAGGING MACHINE
Filed Aug. 22, 1931    5 Sheets-Sheet 5
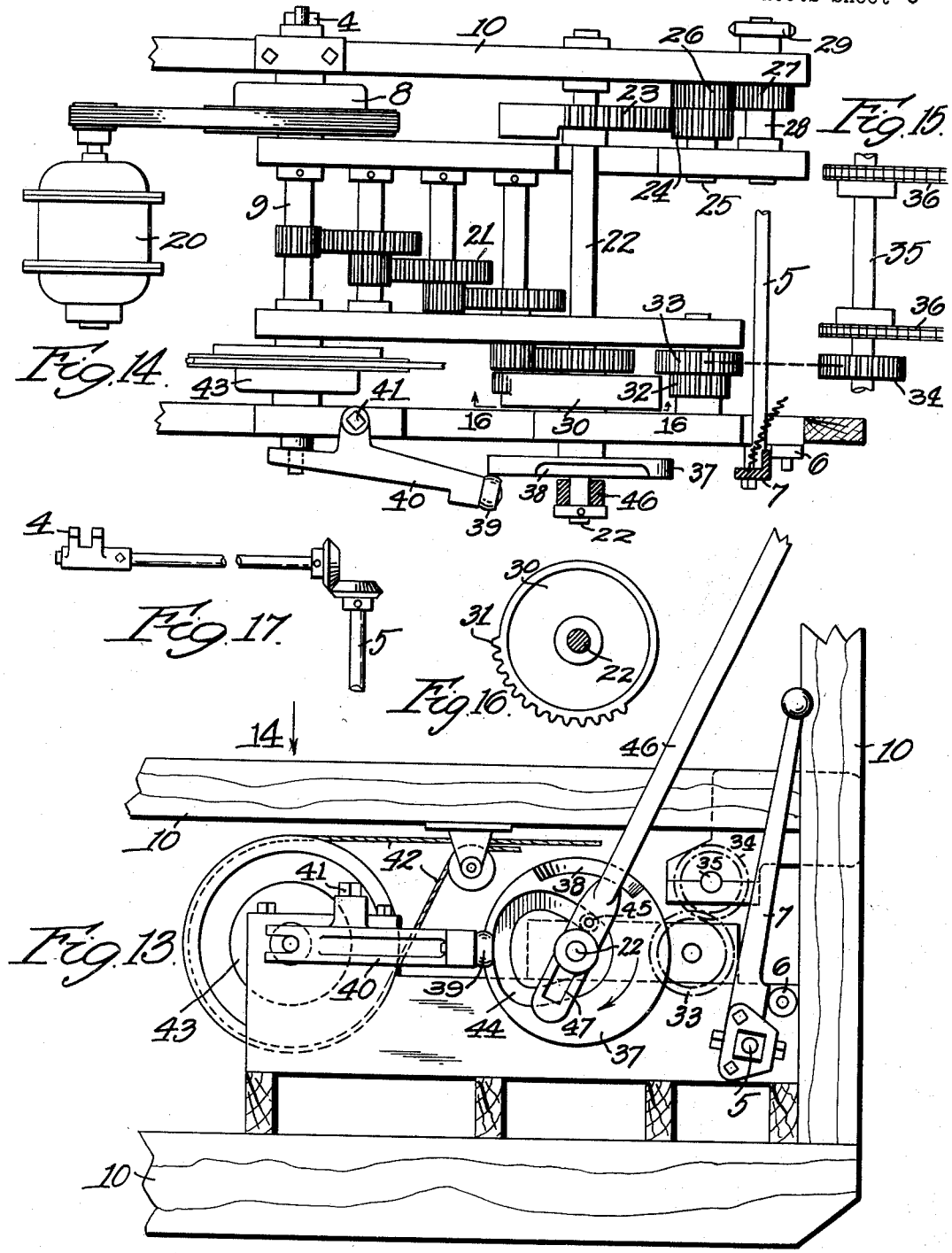
Inventors
Chester E. Williams
Earle M. Chase Patented Apr. 17, 1934

1,955,108

UNITED STATES PATENT OFFICE 1,955,108

BAGGING MACHINE

Chester E. Williams, Worcester, and Earle M. Chase, Springfield, Mass., assignors to Johnson & Bassett, Inc., Worcester, Mass., a corporation of Massachusetts Application August 22, 1931, Serial No. 558,782

3 Claims. (Cl. 226—53)

This invention relates to a bagging machine, particularly designed for bagging potatoes but capable of general use for other articles in the nature of fruits and vegetables.

The principal objects of the invention are to provide a machine having its several parts properly timed so as to open a paper or textile bag, open the bottom of a hopper to drop the articles in it, weigh it and finally sew up the bag; to provide an improved feeding hopper for dropping the vegetables or fruit into the bag and means for operating it in such a way that sections of the bottom of the hopper will act to open the bag fully to receive them; to provide a conveyer which takes the bags along through the machine from the position in which they are filled to that in which they are sewed and which has an intermittent action to keep the bag stationary while these operations are being performed; to provide an improved form of conveyer comprising pivoted flights for engaging the bags and passing them through the machine; and to provide mechanism for running the several elements of the machine in synchronism from a single source of power.

Other objects and advantages of the invention will appear hereinafter.

Reference is to be had to the accompanying drawings in which

Fig. 1 is a side view of a bagging machine constructed in accordance with this invention;

Fig. 2 is a plan of a bin in which the potatoes or the like are deposited for operation upon them by this machine;

Fig. 3 is a plan of the machine;

Fig. 4 is a side view of the conveyer and parts for supporting it;

Fig. 5 is a sectional view on the line 5—5 of Fig. 4;

Fig. 6 is a front view of the bottom part of the feeding hopper;

Fig. 7 is a sectional view of the feeding hopper on the line 7—7 of Fig. 6;

Fig. 8 is a central sectional view of the feeding hopper on the line 8—8 of Fig. 6;

Fig. 9 is a rear view of the lower part of the feeding hopper showing how it operates to perform the functions of opening the bag and delivering the articles into it;

Fig. 10 is a longitudinal sectional view on the line 10—10 of Fig. 3 on enlarged scale;

Fig. 11 is a front view of the indicating part of the scale;

Fig. 12 is a top view of a bag which can be filled by this machine;

Fig. 13 is a front elevation similar to Fig. 1 on enlarged scale showing the means for operating the hopper and conveyer and the means for operating the sewing machine;

Fig. 14 is a plan of the operating gearing as indicated by the arrow 14 in Fig. 13;

Fig. 15 is a similar view of the chains for operating the conveyer;

Fig. 16 is a sectional view on the line 16—16 of Fig. 14 showing a segmental gear for operating the conveyer, and Fig. 17 is a detailed view of the starting gearing.

This, as stated, is a machine for taking potatoes, fruits, or the like, from a bin and automatically opening bags and filling them and then carrying the bags through a weighing apparatus and finally into a sewing apparatus. The machine is shown as comprising a frame 10 all rigidly connected and mounted on rollers 11 so that it can be transported easily around a room. In general it may be stated that the potatoes or the like are dumped into a bin 12 taken by a feed apron 13 having upright flights 14 into a hopper 15 and that the hopper delivers the potatoes into a bag 67 located between a pair of guides 68. The potatoes in one or more compartments between the flights 14 constitute a charge and are delivered to constitute a bagful. The bag is then moved along by a conveyer, which will be described more fully later, over a weighing pan 17, where a bag stops to be weighed, and then on a platform 18 where the bag is sewed up by a sewing machine 19. The details of the sewing machine and sealer are not shown herein as many types can be used for this purpose.

The power may be received from any desired source, but we have shown a motor 20 for operating the machine. The motor is connected with a shaft 9 through any desired kind of clutch 8 by the operation of a starting lever 7. This lever is spring pressed against a stop 6 and fixed on a shaft 5. It is shown in the off position. The lever is pivoted to the shaft on a cross axis so that it can be swung forward to rest against the flat front face of the stop 6. This closes the clutch through a yoke 4. This motor, through a train of reducing gears 21, drives the main shaft 22 of the machine. This shaft is supported in suitable boxes or bearings on the frame 10.

At one end the shaft 22 is provided with a segmental gear 23 which drives intermittently a gear 24 on a shaft 25. On this shaft 25 is another gear 26 meshing with a gear 27 on the feed apron driving shaft 28 which is provided with a sprocket 29 for driving the apron 13. On the other end this shaft 22 is provided with a gear 30 which has the segment 31 extending through about one-third of its circumference which, upon each revolution, rotates a gear 32 a complete revolution. This gear is fixed on the same shaft as a gear 33 which is in mesh with a gear 34 on a conveyer shaft 35 and thus operates the main conveyer 36 of the machine.

On the shaft 22 is also a cam wheel 37 provided with a depression 38 constituting a cam operating a roller 39 on a lever 40 pivoted at 41. This lever through a yoke, opens and closes a second clutch 43 on the shaft 9. Therefore it stops and starts periodically the operation of a belt shown in the form of a cord 42, on a loose wheel on the shaft 9 for operating the sewing machine 19, of course, intermittently.

On the cam wheel 37 is also a cam groove 44 in which runs a roller 45 on a link 46. This link has an elongated slot 47 through which the shaft 22 passes, which constitutes the pivot of the link. Obviously the link 46 will be moved up and down as the cam wheel 37 rotates.

The upper end of the link 46 is pivoted to an arm 48 fixed on a shaft 49. This shaft is provided with two bevel gears 50 which mesh with two bevel gears 51 on two parallel side shafts 52. On the other end of each of the side shafts is a bevel gear 53 each meshing with a bevel gear 54 on a shaft 55 parallel to the shaft 49. These four shafts surround the hopper and to each one of them is secured a concave plate 56. These plates are of sector shape, the angles being 90°, and together they fill the circular opening in the bottom of the hopper 15, or substantially so. When the shaft 49 is turned by the operation of the link 46 all these plates 56 are lowered, turning out about the axes of their several shafts, thus opening the hopper from the position shown in Fig. 8 to that shown in Fig. 9. This action spreads out the bag 67, as indicated in the latter figure, and also drops the contents through the hopper into it.

The plates 56 are provided with rounded extensions 57 to engage the bag and provide a proper surface for holding it out in the proper position. The hopper delivers the contents between two or more flights 14 of the apron 13 which, as will be seen, is operated intermittently in unison with the rest of the mechanism. Over the sprocket 29 passes a chain 58 which operates a shaft 60. This is the apron shaft and it also has another sprocket operating an adjustable and rotatable leveler 61 to dislodge any potatoes projecting above the desired line.

The conveyer 36 also runs intermittently in synchronism with the other parts of the machine. It consists of two chains carrying between them at regular intervals, pivoted flights 62. The top strand of the conveyer is flat and preferably horizontal. Each flight carries a guiding flange 63 which is supported by horizontal plates 64 constituting a track for them. These guides, being perpendicular to the flight, thus hold them in vertical position so that they will engage the bags along a vertical plane and push them along whenever the conveyer moves.

The track 64 is cut out at two opposite points 65 to allow the flights to swing back by gravity as shown in Fig. 10 so as not to touch the bag 67 when on the elevated weighing pan. At this time the guide 63 engages an inclined stop 66 to hold them in position to move easily on the track at the next motion on the conveyer.

The frame 10 is provided with vertical guides 68 for the bags, but at the weighing station concave plates 69 are provided for the bags to lie against, when in proper upright position for being weighed.

A small bin 70 is provided for the use of the inspector, who takes potatoes out of the bags while on the weighing pan or puts them in to make the weight correct.

In operation, the potatoes, or other articles are dumped by hand or machine into the bin 12 at intervals or continuously during the operation of the machine. The starting lever 7 is operated to close the clutch 8. The apron then operates intermittently but in a predetermined sequence. The apron deposits all the potatoes between two or more adjacent flights 14 through the hopper 15. The cam 44 operates the bottom of the hopper to deliver the potatoes in a bag, which is placed in position on the conveyer when stationary by an attendant. The top of the bag is opened by the bottom of the hopper, as stated. Now the segment 30 operates the conveyor 36 a distance equal to the space between two of its flights and that bag is pushed up on the scale pan 17. The inspecting and weighing are done by another attendant, all the filled bags weighing the same. At the next operation of the conveyor, this bag is moved under the sewing machine and the bag is sewed across the top ready for delivery. The conveyor at its next operation, drops the bag out of the machine into a bin or on another conveyor or the bags can be taken off by hand.

Thus all the operations are intermittent but absolutely in synchronism.

Although we have illustrated and described only one form of the invention we are aware of the fact that modifications can be made therein by any person skilled in the art without departing from the scope of the invention as expressed in the claims. Therefore we do not wish to be limited in this respect but what we do claim is:

1. In a machine for filling bags with articles, the combination of a main shaft and means for driving it continuously, of a feeding-in apron, means operated by the main shaft for advancing said apron intermittently to feed and discharge said articles intermittently, a hopper located in position to guide the articles from the apron, said hopper having a bottom consisting of movable sections, means operated by said main shaft for moving said sections simultaneously to open a bag located under them and discharge the contents through the hopper into the bag, a main conveyer for conveying the bags from the filling position, means operated by the main shaft for intermittently operating said conveyer, a sewing machine located over the conveyer, and means operated by said main shaft for intermittently operating the sewing machine, said sewing machine being located in a position to sew up the tops of the bags while located on said conveyer.

2. In a bagging machine, the combination with a main shaft and means for operating it continuously, of a cam on said shaft, a link having a roller thereon for engaging the cam to reciprocate the link as the shaft rotates, a hopper for receiving and discharging articles to be bagged, said hopper having a bottom consisting of four plates normally closing the hopper, said plates being of sector shape so as to close the bottom of the hopper, a corresponding series of four shafts arranged to form the four sides of a square and adapted to turn, each plate being fixed to one of said shafts, an arm on one of said shafts connected with said link, whereby, when the link rises, that shaft will be turned, connections between that shaft and the other shafts for swinging all of said plates downwardly to discharge the contents of the hopper, and a convex extension on each plate for engaging the inside surfaces of a bag placed under them to spread the bag open.

3. In a bagging machine, the combination with a main shaft and means for operating it continuously, of a cam on said shaft, a link having a roller thereon for engaging the cam to reciprocate the link as the shaft rotates, a hopper for receiving and discharging articles to be bagged, said hopper having a bottom consisting of plates, said plates being of sector shape so as to close the bottom of the hopper, a corresponding series of shafts adapted to turn, each plate being fixed to one of said shafts, an arm on one of said shafts connected with said link, whereby, when the link rises, that shaft will be turned, connections between that shaft and the other shafts for swinging all of said plates downwardly to discharge the contents of the hopper, and a convex extension on each plate for engaging the inside surfaces of a bag placed under them to spread the bag open.

CHESTER E. WILLIAMS.
EARLE M. CHASE.